Jan. 10, 1967   R. R. BALAGUER   3,297,488
DRY CELL BATTERY HAVING A PLURALITY OF CARBON ELECTRODES SPACED
AROUND THE PERIPHERY AND IN CONTACT WITH THE CONTAINER
Filed Aug. 25, 1964   3 Sheets-Sheet 1

United States Patent Office 3,297,488
Patented Jan. 10, 1967

1

3,297,488
DRY CELL BATTERY HAVING A PLURALITY OF CARBON ELECTRODES SPACED AROUND THE PERIPHERY AND IN CONTACT WITH THE CONTAINER
Rodolfo Rodriguez Balaguer, Fort Lauderdale, Fla., assignor, by mesne assignments, to Patent Holding Corporation, Fort Lauderdale, Fla., a corporation of Florida
Filed Aug. 25, 1964, Ser. No. 391,918
8 Claims. (Cl. 136—107)

The present invention relates to primary batteries, and more particularly to batteries of the so-called "dry" type.

The principal object of the present invention has been the provision of a novel and improved dry cell battery construction.

More particularly, it has been the principal object of the present invention to provide a dry cell battery construction which exhibits an unusually high watt-hour per pound capacity.

Another object of the invention has been the provision of a dry cell battery construction which maximizes electrolyte and anode metal usage.

Still another object of the invention has been the provision of a dry cell battery construction which affords substantialy even and uniform corrosion of the anode metal.

Another object of the invention has been the provision of a dry cell battery having an increased capacity without any increase in size or weight.

Still a further object of the invention has been the provision of a dry cell battery especially adapted to the requirements of a magnesium anode.

The dry cell battery shown in United States Patent 2,903,499, which issued September 8, 1959, to R. R. Balaguer, has been found to be highly efficient and well adapted to the requirements of magnesium cells. The present invention affords a number of the advantages of the battery of that patent and in addition provides a higher watt-hour per pound capacity, especially in light to moderate load services, e.g., the 7½ ohms continuous service test.

Other and further objects, features and advantages of the invention will appear more fully and from the following description of the invention taken in connection with the appended drawings, in which.

Figure 2:
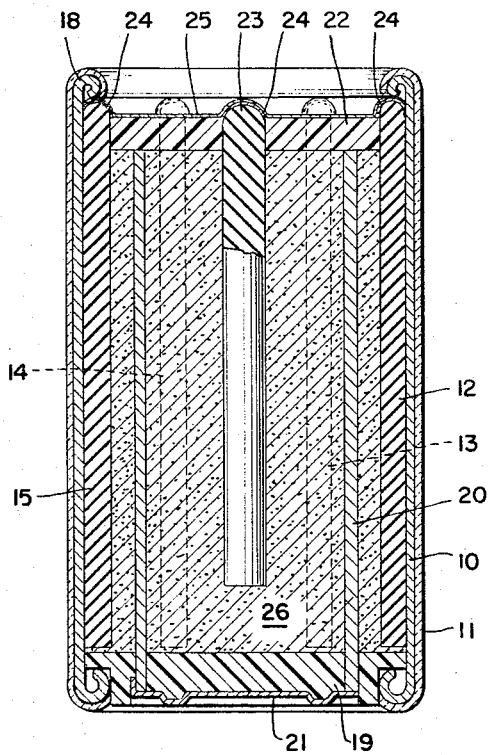
FIG. 2 is a longitudinal sectional view taken along the line 2—2 of FIG. 1.
Figure 1:
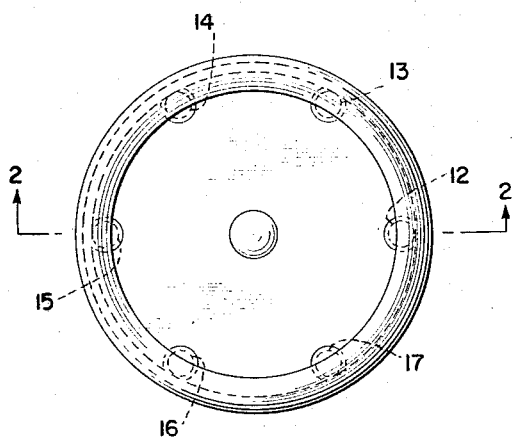
FIG. 1 is a top plan view of a "D" size battery embodying the invention.

Referring now to the drawings and more particularly to FIGS. 1 and 2, the dry cell battery illustrated is of the so-called "D" size, although essentially the same construction may be used for smaller and larger size cells. The cell comprises a paper or other electrically insulating cylinder 10 having an inelastic reinforcing wrapping 11 which might be, for example, a steel jacket, a fiberglass tape or a steel or fiberglass thread, as described in the copending United States patent applications of Rodolfo

2

Rodriguez Balaguer Serial Nos. 260,270 and 312,049, now United States Patent 3,214,299, filed Feb. 21, 1963 and Sept. 27, 1963, respectively. A paper or plastic outer jacket (not shown) may also be provided.

A group of evenly circumferentially spaced carbon rods 12–17 are adhesively affixed to the inner surface of paper cylinder 10. For convenience the paper cylinder 10 may be impregnated with a suitable adhesive material and the carbon rods 12–17 may be stuck to the inner surface. Fiberglass resin (a polyester resin of the type commonly used to impregnate fiberglass) may with advantage be used as the adhesive coating. The cylinder 10 may be made of one or more layers of resin impregnated fiberglass fabric, in which case the reinforcement 11 may be omitted.

The rods 12–17 extend axially of the cylinder 10 and are parallel to each other and to the axis of the cylinder 10. The rods 12–17 are evenly spaced every 60° around the periphery of the cylinder 10, as shown in FIG. 1, and extend vertically from just below a crimped end 18 of the cylinder 10 to just above a bottom closure disk 19. The rods 12–17 are preferably baked carbon although green carbon may be used. For a "D" size cell the rods 12–17 typically might be $3/32''$ in diameter.

The bottom closure disk 19 supports a cylindrical metallic anode 20 and affords an electrical connection from the anode to a tinned steel external contact disk 21. The bottom closure is preferably made of plastic and the construction may be as described in the copending United States patent application of Rodolfo Rodriguez Balaguer, Serial No. 357,190, filed April 3, 1964.

The anode cylinder 20 is coaxial with paper cylinder 10 and is spaced radially from the carbon rods 12–17. The anode cylinder 20 extends upwardly to the bottom surface of a plastic closure disk 22. The anode will be made from a metal consistent with the battery electrochemical system, and most commonly will be zinc or magnesium. A typical magnesium anode might be 0.055'' thick and have a ⅞'' outside diameter.

A central carbon rod 23 is supported in a central hole in disk 22 and is coaxial with disks 12–17 and anode 20. The disk 22 also has apertures to accommodate rods 12–17. Rods 12–17 and 23 project above the top surface of disk 22 and are covered with conductive metal caps 24 which are received in corresponding disked apertures in a conductive metal plate 25. Typically the caps 24 might be brass, while the plate 25 might be tinned steel. Plate 25 electrically interconnects the individual cathode rods 12–17 and 23. The plate 25 serves as one battery terminal, while the disk 21 serves as the other terminal.

The central rod 23 may be equal in length to the rods 12–17 or may be somewhat shorter as shown. The central rod 23 may be made of the same carbon as the rods 12–17 or it may be different, e.g., to afford a different resistivity. The spaces between the rod 23 and the anode 20 and between the anode 20 and the rods 12–17 are filled with the battery mix, designated 26. A suitable bibulous coating of paper or other suitable material will usually cover all parts of the anode exposed to the battery mix to prevent direct contact between the battery mix and anode.

Where desired, and particularly in the case of a zinc cell, battery mix may be omitted from the cell in the region adjacent closure disk 19 to provide space for liquid exuded upon discharge of the cell. However, except for such liquid receiving space and the space occupied by anode 20 and carbon cathode elements 12–17 and 23, the volume between the disks 19 and 22 and cylinder 10 will be filled with battery mix, suitably compacted as is well known in the art.

The battery mix 26 may be of any type suited to the anode metal selected. A typical battery mix composition for use with a magnesium anode is the following (percentages being by weight):

| | Percent |
|---|---|
| Type M manganese dioxide (synthetic) chemical ore | 88 |
| $Mg(OH)_2$ | 1 |
| $BaCrO_4$ | 3 |
| Acetylene black wet 550 ml./1000 g. with 250 g./l. $MgBr_2 + 0.25$ g./l. $Na_2CrO_4$ | 8 |

A typical charge for a "D" size cell might be 70 grams of mix.

It is important that the cathode rods 12–17 be in contact or at least substantially in contact with the outer cylinder 10 so that little or no battery mix lies radially outward of the cathode rods 12–17. It has been found that cell capacity is materially reduced by locating the rods 12–17 radially inward of the cylinder 10. The reason for this reduction in capacity is not thoroughly understood, but it is believed that the electrical path from the respective cathode rods 12–17 to anode 20 will not extend appreciably radially outward from the cathode rods so that, where battery mix is located radially outward of the cathode rods 12–17, such battery mix will be utilized at most only to a limited extent in the battery electrochemical reactions.

Figure 3:
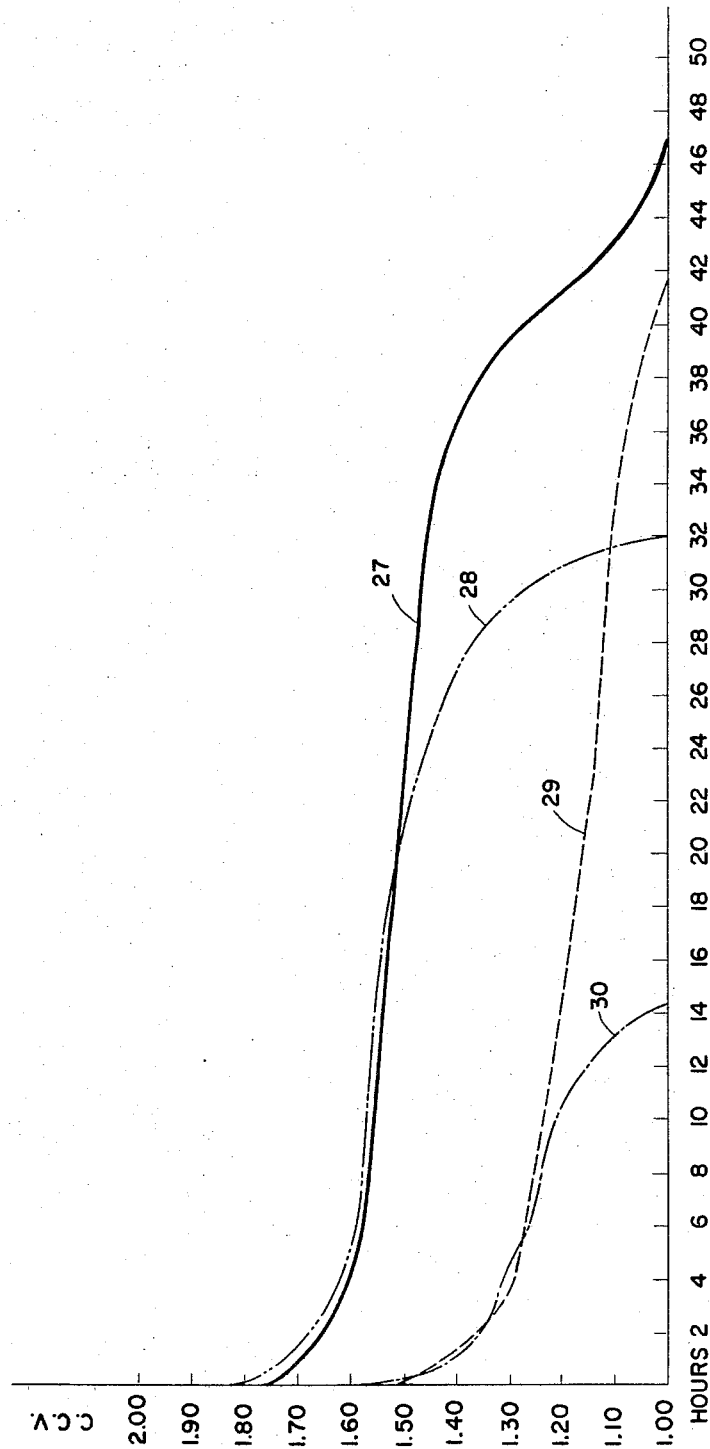
FIG. 3 is a set of comparative performance curves.

FIG. 3 sets forth comparative performance curves for a battery embodying the invention and three other batteries. FIG. 3 is a plot of closed circuit voltage versus hours for the standard 7½ ohm continuous test at 21° C. In each case the batteries were fresh "D" size cells.

The solid line curve, designated 27, shows the results for a battery constructed as shown in FIGS. 1 and 2 with a kraft paper jacket, 70 grams of mix generally of the type described above, a 0.055″ thick (⅞″ O.D.) magnesium anode and a total weight of 103 grams. The battery had an open circuit voltage of 1.86 volts and yielded 9.111 ampere hours, 13.312 watt-hours and 58.6 watt-hours per pound.

The dotted line curve 28 was for a magnesium cell constructed as in the aforementioned Balaguer patent, i.e., with a carbon cup. The anode and battery mix were the same as for curve 27 except that only 55 grams of mix could be used due to the larger carbon volume. The total cell weight was 109 grams. The cell had an open circuit voltage of 1.82 volts and yielded 6.432 ampere hours, 9.703 watt-hours and 40.4 watt-hours per pound.

The dashed line 29 represents a standard commercial alkaline cell having a total weight of 126 grams. This cell had an open circuit voltage of 1.57 volts and yielded 6.44 ampere hours, 7.83 watt-hours and 28.20 watt-hours per pound.

The dotted line 30 represents a commercial heavy duty zinc cell having a total weight of 91 grams and an open circuit voltage of 1.67 volts. The cell yielded 2.42 ampere hours, 3.10 watt-hours and 15.42 watt-hours per pound.

The various cell capacities are summarized in tabular form as follows:

| | Carbon Rod Cell of the Invention | Carbon Cup Cell of Balaguer U.S. Patent 2,903,499 | Alkaline Cell | Heavy Duty Zinc Cell |
|---|---|---|---|---|
| Open circuit voltage | 1.86 | 1.82 | 1.57 | 1.67 |
| Ampere hours | 9.111 | 6.432 | 6.44 | 2.24 |
| Watt-hours | 13.312 | 9.703 | 7.83 | 3.14 |
| Watt-hours per pound | 58.6 | 40.4 | 28.20 | 15.02 |

Figure 4:
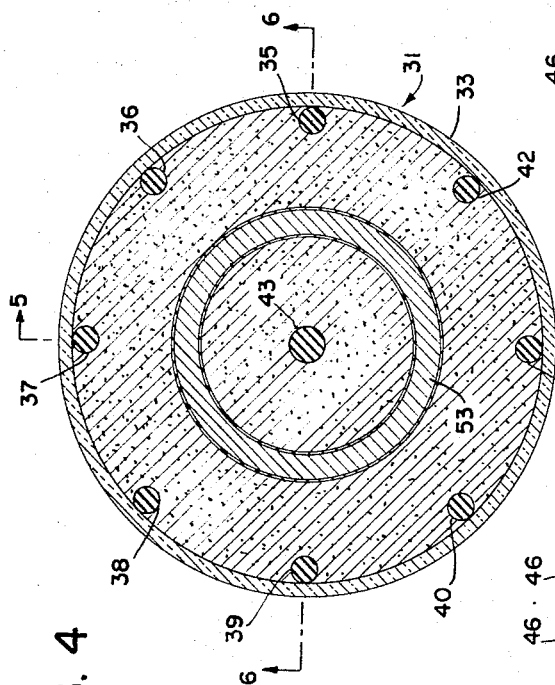
FIG. 4 is a horizontal sectional view of a large size battery embodying the invention.
Figure 6:
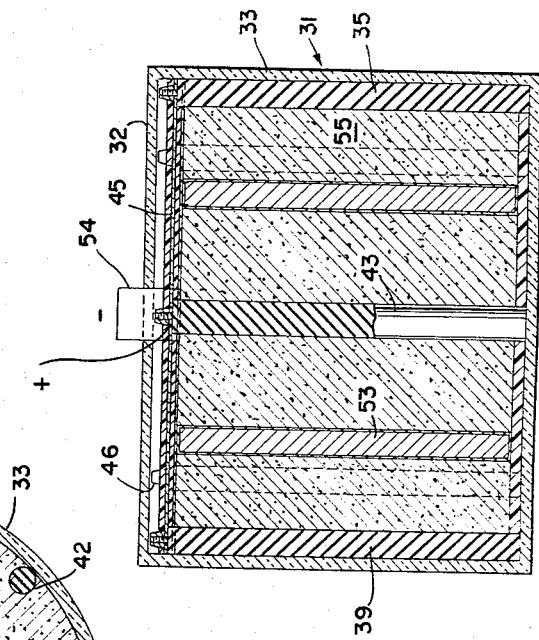
FIG. 6 is a longitudinal sectional view taken along the line 6—6 of FIG. 4.
Figure 5:
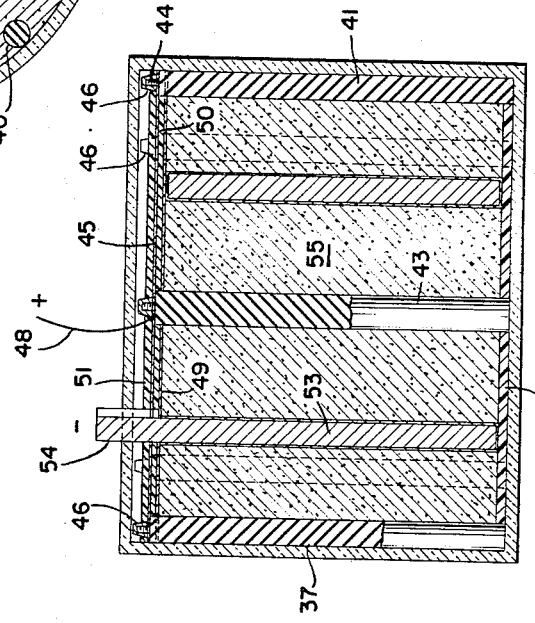
FIG. 5 is a longitudinal sectional view taken along the line 5—5 of FIG. 4.

Referring now to FIGS. 4–6, there is shown a battery construction according to the invention which is particularly well suited to larger size batteries, e.g., those of #6 size and larger. The cells of FIGS. 4–6 comprises a cylindrical cup 31 made of numerous layers of resin impregnated fiberglass cloth and having a top wall 32, a cylindrical side wall 33 and a bottom wall 34. The bottom and side walls are first formed as an open-ended cup and, after the battery is assembled, the top wall is closed and resin impregnated. Typically, the cup 31 might have an inside diameter of 7″ and an overall height of 5.9″. The cup may be made of numerous, e.g., 8–12, layers of fiberglass cloth with resin applied in the usual way for making a molded fiberglass product.

Eight carbon rods 35, 36, 37, 38, 39, 40, 41 and 42 are disposed axially within the cup 31 and are in contact with and adhesively secured to the wall 33. The rods 35–42 might be ⅜″ in diameter and are spaced 45° apart around the internal periphery of the cup 31. The rods 35–42 extend from the top surface of bottom wall 34 to a height slightly below top wall 32.

A central axially disposed carbon rod 43, which might be ½″ in diameter, is of equal length with rods 35–42. The rods 35–43 are each provided with top screw threaded posts 44 which project through aligned openings in a tinned steel disk 45.

The disk 45 is clamped to the carbon rods by nuts 46. An external electrical connection to the disk 45 and hence also to the carbon rods is afforded by a wire or strap 48 which may be soldered to disk 45 or may be held by the nut 46 threaded on post 44 of rod 43.

A cardboard or other suitable insulating washer 49 is located adjacent the tops of the carbon rods and is provided with apertures for accommodating the rods. An electrically insulating plastic disk 50 is disposed between washer 49 and disk 45 and is provided with apertures to accommodate the carbon rods. A similar disk 51 overlies disk 45 and is provided with holes to accommodate nuts 46.

A suitable insulating layer 52, which might be an epoxy resin, covers the upper surface of cup bottom wall 34 except for the bottom ends of the carbon rods. A cylindrical metal anode 53, which might be a ⅜″ thick magnesium cylinder covered on both sides with a bibulous paper wrapping, extends from the top surface of layer 52 substantially to washer 49. The anode 53 is coaxial with cup 31, rod 43 and the circle defined by the centers of rods 35–42. An integral head 54 projects from the top of anode 53 through washer 49, disk 50, disk 45, disk 51 and fiberglass top 32, and serves as the cell negative terminal. Anode 53 is insulated from disk 45, preferably by providing the latter with an oversized opening accommodating head 54. The space within the cup 31 which is not occupied by other elements is filled or substantially filled with battery mix 55 from layer 52 to washer 40. Where desired, as in the case of a zinc cell, space may be left for liquid exuded during battery discharge.

It is desirable that the central carbon rod be of substantially greater diameter than the peripheral rods. Thus for a "D" size cell the central rod might be 5/32″ in diameter and the peripheral rods might be 3/32″ in diameter. For a 7″ diameter cell, the central rod might be ½″ in diameter and the peripheral rods might be ⅜″ in diameter.

In general, the number of peripheral rods required for a satisfactory battery will increase with cell diameter. Thus, for a "D" size cell six peripheral rods is the preferred member, while for a 7″ cell light peripheral rods are preferred. It is desirable that no more peripheral rods than necessary for optimum performance be used, since these rods occupy space which would otherwise hold battery mix. It has been found that the peripheral rods should be substantially evenly spaced around the periphery and in contact or substantial contact with the inner surface of the cell container outer wall. The number of peripheral rods should be selected so that the length of the electrical path from each peripheral rod to the anode through the mix will not be unduly long so that all parts of the mix will be utilized substantially in the electrochemical reactions incident to cell discharge.

While the invention has been described in connection with specific embodiments thereof and in specific uses, various modifications thereof will occur to those skilled in the art without departing from the spirit and scope of the invention as set forth in the appended claims.

What is claimed is:

1. A dry cell battery, comprising a hollow, elongated, electrically insulating container, closure means for the top and bottom of said container, a plurality of axially extending elongated carbon electrodes disposed within said container and being substantially in contact with the wall of said container and being spaced from each other around the periphery of said container, an additional elongated carbon electrode disposed along the central axis of said container, a first contact element external to said container, means to electrically interconnect said contact element, said additional carbon electrode and the electrodes of said plurality of electrodes, a hollow, elongated, metallic anode disposed within said container and being disposed along the axis of said container, said anode being located intermediate said additional carbon electrode and the electrodes of said plurality of electrodes, a second contact element external to said container, means to electrically interconnect said second contact element and said anode, and battery mix substantially filling the space within said container between said additional electrode and said anode and between said anode and the wall of said container.

2. A dry cell battery, comprising a hollow, elongated, cylindrical, electrically insulating container, closure means for the top and bottom of said container, a plurality of axially extending elongated carbon rods disposed within said container and being substantially in contact with the wall of said container and being spaced from each other around the periphery of said container, an additional elongated carbon rod disposed along the central axis of said container coaxially with said container, a first contact element external to said container, means to electrically interconnect said contact element, said additional carbon rod and the rods of said plurality of rods, a hollow, elongated, cylindrical, metallic anode disposed within said container and being coaxial with said container, said anode being located intermediate said additional carbon rod and the rods of said plurality of rods, a second contact element external to said container, means to electrically interconnect said second contact element and said anode, and battery mix substantially filling the space within said container between said additional rod and said anode and between said anode and the wall of said container.

3. A dry cell battery, comprising a hollow, elongated, cylindrical, electrically insulating container, closure means for the top and bottom of said container, a plurality of axially extending elongated carbon rods disposed within said container and being substantially in contact with the wall of said container and being spaced substantially equidistant from each other around the periphery of said container, an additional elongated carbon rod having a diameter greater than the diameter of the rods of said plurality of rods and being disposed along the central axis of said container coaxially with said container, a first contact element external to said container, means to electrically interconnect said contact element, said additional carbon rod and the rods of said plurality of rods, a hollow, elongated, cylindrical, metallic anode disposed within said container and being coaxial with said container, said anode being located intermediate said additional carbon rod and the rods of said plurality of rods, a second contact element external to said container, means to electrically interconnect said second contact element and said anode, battery mix substantially filling the space within said container between said additional rod and said anode and between said anode and the wall of said container, and a bibulous covering on said anode preventing direct contact between said anode and said battery mix.

4. A dry cell battery as set forth in claim 3 in which said container is made of molded fiberglass.

5. A dry cell battery as set forth in claim 4 in which said top and bottom closure means include molded fiberglass walls integral with said container.

6. A dry cell battery as set forth in claim 3 in which said rods of said plurality of carbon rods are adhesively affixed to said container wall.

7. A dry cell battery as set forth in claim 3 in which said plurality of carbon rods comprises at least six carbon rods.

8. A dry cell battery, comprising a hollow, elongated, cylindrical, electrically insulating container, closure means for the top and bottom of said container, a plurality of axially extending elongated carbon rods disposed within said container and being adhesively attached to the wall of said container and being spaced substantially equidistant from each other around the periphery of said container, an additional elongated carbon rod and being disposed along the central axis of said container coaxially with said container, a first contact element external to said container, means to electrically interconnect said contact element, said additional carbon rod and the rods of said plurality of rods, a hollow, elongated, cylindrical metallic anode disposed within said container and being coaxial with said container, said anode being located intermediate said additional carbon rod and the rods of said plurality of rods, a second contact element external to said container, means to electrically interconnect said second contact element and said anode, battery mix substantially filling the space within said container between said additional rod and said anode and between said anode and the wall of said container, and a bibulous covering on said anode preventing direct contact between said anode and said battery mix.

References Cited by the Examiner

UNITED STATES PATENTS

| | | | |
|---|---|---|---|
| 2,823,246 | 2/1958 | Lang | 136—107 |
| 3,214,299 | 10/1965 | Balaguer | 136—107 |

WINSTON A. DOUGLAS, *Primary Examiner.*

B. J. OHLENDORF, *Assistant Examiner.*